United States Patent [19]
Witte

[11] Patent Number: 6,059,485
[45] Date of Patent: May 9, 2000

[54] COUPLING FOR PARALLELEPIPED-SHAPED MOUNTING COMPONENTS FOR CHUCKING WORKPIECES

[75] Inventor: Horst Witte, Nahrendorf, Germany

[73] Assignee: Horst Witt Entwicklungs- und Vertriebs-KG, Nahrendorf, Germany

[21] Appl. No.: 09/044,601

[22] Filed: Mar. 19, 1998

[30] Foreign Application Priority Data

Apr. 3, 1997 [DE] Germany ............... 297 05 895 U

[51] Int. Cl.$^7$ ........................... B25B 1/10
[52] U.S. Cl. ............... 403/322.1; 403/374.3; 403/231; 403/7; 279/106; 74/89.14; 269/48.1
[58] Field of Search ............... 403/322.1, 321, 403/374.3, 18, 19, 11, 7, 230, 231, 322.4, 373; 279/106; 269/48.1, 43; 74/89.14

[56] References Cited

U.S. PATENT DOCUMENTS

| | | |
|---|---|---|
| 1,874,519 | 2/1932 | Haubrock . |
| 2,821,946 | 2/1958 | Goekler ............... 269/48.1 |
| 4,935,595 | 6/1990 | Fuse ............... 279/106 X |
| 4,967,669 | 11/1990 | Kuchta ............... 403/18 X |

FOREIGN PATENT DOCUMENTS

| | | |
|---|---|---|
| 132005 | 5/1946 | Australia ............... 279/106 |
| 0222147 | 8/1989 | European Pat. Off. . |
| 1578469 | 8/1969 | France . |
| 3329988 | 2/1985 | Germany . |
| 4001568 | 7/1990 | Germany . |
| 2272176 | 5/1994 | United Kingdom . |
| 9208572 | 5/1992 | WIPO . |
| 9635547 | 11/1996 | WIPO . |

Primary Examiner—Terry Lee Melius
Assistant Examiner—David E. Bochna
Attorney, Agent, or Firm—Friedrich Kueffner

[57] ABSTRACT

A coupling for parallelepiped-shaped or block-shaped mounting components for chucking workpieces in defined and reproducible positions, wherein the mounting components are provided with fitting bores and transverse bores having the same cross-sections and being arranged in regular coordinate intervals. The coupling includes a coupling member having a projection which can be inserted with precise fit into a hollow space provided at the end face of a mounting component to be connected. A plurality of hook elements are arranged in the projection, wherein the hook elements can be pivoted so as to produce a positively locking engagement with the wall surface of an adjacent fitting bore or transverse bore.

4 Claims, 2 Drawing Sheets

COUPLING FOR PARALLELEPIPED-SHAPED MOUNTING COMPONENTS FOR CHUCKING WORKPIECES

BACKGROUND OF THE INVENTION

1. Field of the Invention

The present invention relates to a coupling for parallelepiped-shaped or block-shaped mounting components for chucking workpieces in defined and reproducible positions. The mounting components are provided with fitting bores and transverse bores having the same cross-sections and being arranged in regular coordinate intervals.

2. Description of the Related Art

EP-B1 222 147 discloses a system for constructing devices for chucking workpieces in defined and reproducible positions. This system includes hollow parallelepiped-shaped, more or less elongated mounting components which are provided with fitting bores and transverse bores having equal cross-sections and being arranged at regular coordinate intervals. In the embodiment known from EP-B1 222 147, a row of fitting bores and transverse bores each are provided in chucking surfaces of the mounting components which extend perpendicularly to each other.

However, also known in the art are embodiments in which several parallel rows, for example, two or three rows of such bores are provided wherein the bores are arranged in accordance with a certain unit spacing determined by the regular coordinate intervals. The hollow parallelepiped-shaped receiving components are open toward the end faces thereof. When a connection is to be effected at these end faces, or if special end pieces are to be attached, this was done by means of the fitting screws and nut components as they are described in EP-B1 222 147. This procedure was relatively time-consuming.

SUMMARY OF THE INVENTION

Therefore, it is the primary object of the present invention to provide a coupling, i.e., a so-called quick-action coupling, which makes it possible to quickly connect the hollow parallelepiped-shaped receiving components precisely in accordance with the unit spacings and in alignment as well as in accordance with different angular positions. In addition, the coupling is to be inexpensive to produce.

In accordance with the present invention, the coupling includes a coupling member having a projection which can be inserted with precise fit into a hollow space provided at the end face of a mounting component to be connected. A plurality of hook elements are arranged in the projection, wherein the hook elements can be pivoted so as to produce a positively locking engagement with the wall surface of an adjacent fitting bore or transverse bore.

Accordingly, the coupling according to the present invention has a projection which fits precisely into the correspondingly shaped hollow space in the end face of a receiving component to be connected. To ensure that this position is immovably and reproducibly assumed and maintained, a plurality of hook-shaped elements are mounted in the projection, wherein each of the hook-shaped elements is pivotable so as to engage with the wall surface of an adjacent fitting bore or transverse bore in the receiving component. In this manner, the projection is held securely and tightly in a precisely defined position. The hook elements can be released again, so that the coupling can be removed once again. In the assembled state, the coupling forms a structural component which can be easily manipulated.

When two hollow parallelepiped-shaped receiving components are to be connected to each other, the coupling member has two projections. It is also possible to connect more than two receiving components to each other, wherein these receiving components then extend at an angle relative to each other. The coupling member is then to be provided with the corresponding number of projections with hook elements. It is also possible to construct the coupling member as a closing element which closes the hollow space formed at the respective end face of the receiving component, or the coupling member may serve to attach other structural components, in the latter case, only one projection is provided.

In accordance with an advantageous feature of the present invention, the hook element is formed by a worm segment which is rotatably mounted in the projection of the coupling element. The hook element can be pivoted into and out of engagement with the wall surface of the selected fitting bore or transverse bore by means of a worm gear which is also rotatably mounted in the projection. The engagement surface of the worm segment resulting from the segment shape comes in a positively engaging manner into contact with the wall surface of the selected fitting bore or transverse bore when the locking position is assumed.

In accordance with an advantageous feature, the worm gear can be actuated through the same opening at whose wall surface the engagement surface comes into contact. Consequently, the manipulation is made easier, i.e., only one bore is required and only one bore must be accessible.

In accordance with another feature, the coupling member has at least two projections with hook elements and worm segments, wherein the longitudinal axes of the projections are in alignment with each other or extend at an angle relative to each other, wherein, however, the longitudinal axes intersect in the center point of the connecting planes or of the end faces to be connected. Accordingly, when the two receiving components are in alignment with each other, the longitudinal axes are also in alignment with each other. When the receiving components form an angle between each other, for example, a right angle, the longitudinal axes of the receiving components also extend at this angle. The longitudinal axes then intersect in center points of the end faces of the receiving components to be connected.

The coupling according to the present invention makes it possible to ensure an improved aesthetic impression of the known system and particularly to achieve an attractive outer surface of the hollow parallelepiped-shaped receiving components.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
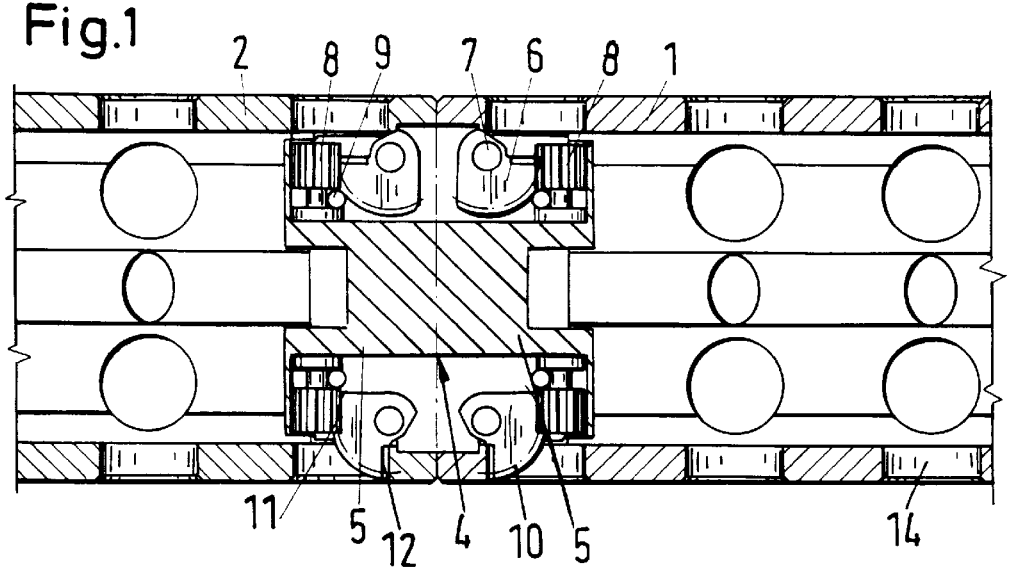
FIG. 1 is a cross-sectional view of an embodiment of a coupling according to the present invention for connecting two aligned hollow parallelepiped-shaped receiving components, wherein the hook elements thereof are released on one side and are in engagement on the other side.

The coupling illustrated in the drawing is normally used for connecting two or more hollow parallelepiped-shaped receiving components 1 and 2. These receiving components are basically known from EP-B1 222 147. However, contrary to the known receiving components, the receiving components 1 and 2 illustrated in the drawing have two rows of fitting bores and transverse bores 14 arranged next to each other, wherein the bores are arranged at a predetermined unit spacing relative to each other, so that they permit chucking in a defined and reproducible position.

Figure 2:
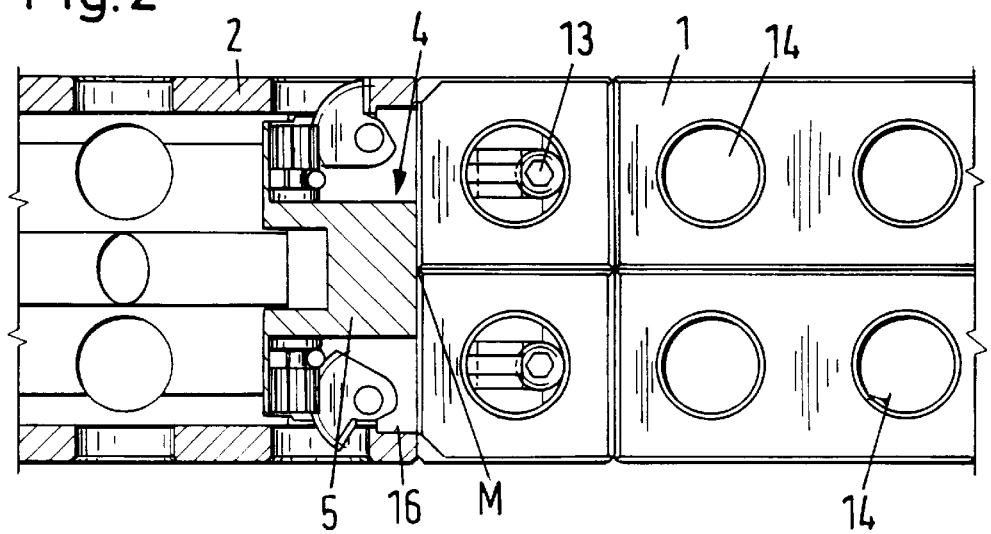
FIG. 2 is a view corresponding to FIG. 1, wherein the hook elements are turned by 90° relative to each other in the oppositely arranged projections.

In the embodiment shown in FIGS. 1 and 2, the actual coupling member 4 has two oppositely located projections 5 which are constructed equally. The two projections of the embodiment of FIGS. 1 and 2 are arranged symmetrically relative to the connecting plane.

Figure 3:
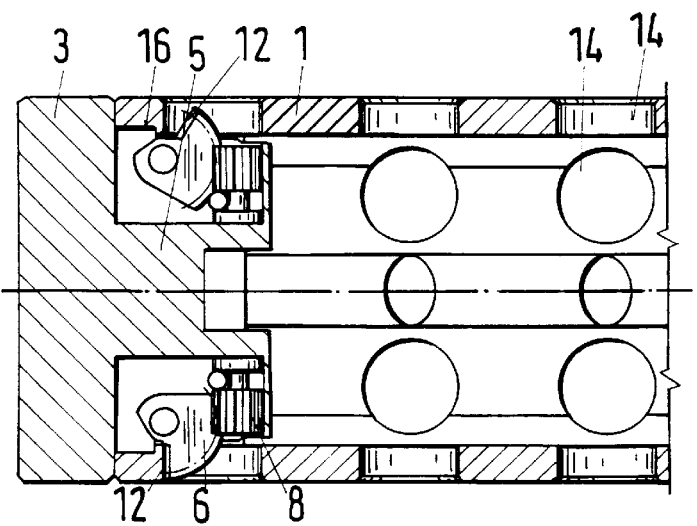
FIG. 3 is a cross-sectional view of an embodiment for closing a parallelepiped-shaped receiving component by means of a coupling having one projection and an end plate.

For forming a coupling member 4, essentially only one projection 5 is required as becomes clear from looking at FIG. 3, i.e., when only one end plate is to be attached to the end face of receiving component 1.

Hook elements in the form of worm segments 6 are rotatably mounted in each projection. The worm segments 6 are mounted by means of pins or shafts 7. The circumferential surfaces of the worm segments 6 constructed as worm wheels are denoted by reference numeral 10. As can be clearly seen in the drawing, an engagement surface 12 is formed at the end of the surface 10.

Figure 4:
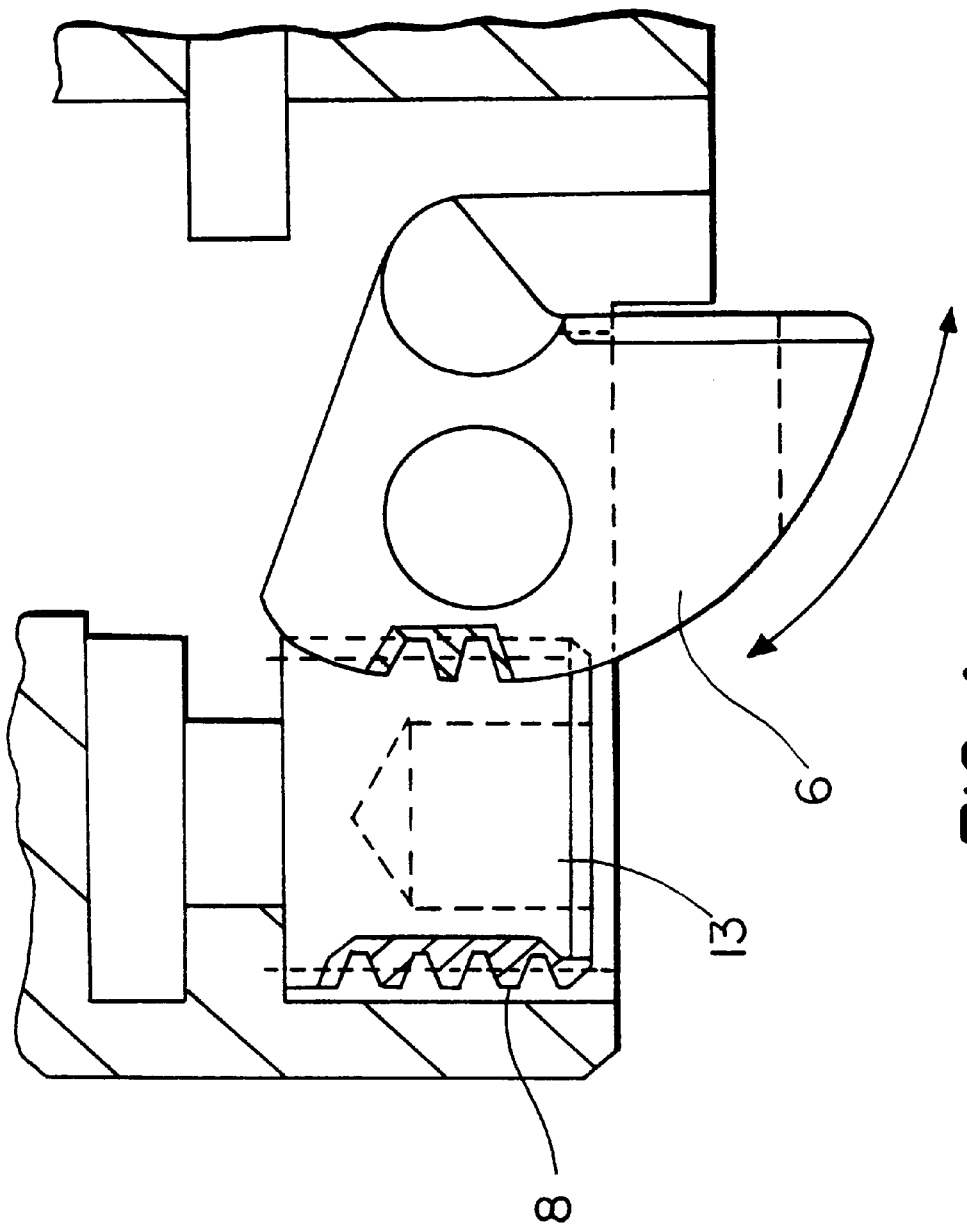
FIG. 4 is an illustration of a hook element in the form of a worm segment engaged by a worm gear.

As illustrated in detail in FIG. 4, a worm gear 8 is provided for each worm segment 6, wherein the worm gear 8 is also mounted in the projection by means of a pin 9. The worm gear 8 can be actuated or turned from the outside at 13 by means of a tool.

In the illustrated embodiment, four worm segments 6 and four worm gears 8 are provided in each projection. In the embodiment of FIG. 1 with oppositely located projections, the worm segments 6 and worm gears 8 are located in a plane. In the embodiment of FIG. 2, the planes in which the worm segments and worm gears are arranged extend at an angle of 90° relative to each other. The number and arrangement of worm segments and worm gears depends on the number and type of receiving components to be connected. If only one row of fitting bores or transverse bores is provided, preferably also only two worm segments and worm gears are provided.

For effecting a connection, for example, the connection of FIG. 1, the coupling member 4 provided with the two projections 5 is first inserted into the corresponding end face of the receiving component 1. The worm segment 6 is now in the position shown at the top of FIG. 1, i.e., the engagement surface 12 is swung back. Subsequently, the other receiving component 2 is pushed onto the other projection of the coupling member 4, wherein the corresponding worm segments are also swung back. Using a tool, for example, a phillips screwdriver, the worm gears can be rotated in order to swing the engagement surfaces 12 of the respective worm segment against the wall surface of the corresponding fitting bore or transverse bore 14. This causes the projection to be pulled tightly into the receiving component and, at the same time, a connection is produced which can only be released again by turning the worm gears in the respectively opposite direction. As is apparent from looking at the drawing, the actuation of the heads 13 of the worm gears takes place through the same opening with which the engagement surface of the corresponding worm segment comes into contact.

In the embodiment of FIG. 2, the planes in which the projections 5 have worm segments and worm gears are turned by 90° relative to each other.

In the embodiment of FIG. 3, the coupling member with one projection 5 is used for fastening an end plate 3.

As can be easily seen from the drawing, it is possible to connect more than two receiving components to each other when an appropriate number of projections are provided in a star-shaped configuration at a coupling member. In that case, the receiving components are not in alignment in the way shown in FIGS. 1 and 2, rather they extend at an angle, for example, a right angle; they also may extend at a different angle relative to each other. However, the longitudinal axes of the receiving components always extend through the center point M of the adjacent end faces, so that a defined and reproducible position of the fitting bores and transverse bores in accordance with the predetermined unit spacing of the individual receiving components to be connected is ensured.

In the illustrated embodiment, the parallelepiped-shaped hollow interior of the projection is recessed at 16 in order to ensure an arrangement of the projections with precise fit.

While specific embodiments of the invention have been shown and described in detail to illustrate the inventive principles, it will be understood that the invention may be embodied otherwise without departing from such principles.

I claim:

1. A coupling for coupling hollow parallelepiped-shaped receiving components for chucking workpieces in defined and reproducible positions, each receiving component having fitting bores and transverse bores having equal diameters and arranged in regular coordinate spacings, the coupling comprising a coupling member having a projection, the projection being adapted to be insertable with precise fit into a hollow space of an end face of a receiving component to be connected, the projection having a plurality of hook elements, the hook elements being pivotable so as to be adapted to move the hook elements into a positively locking engagement with a wall surface of an adjacent fitting bore or transverse bore, further comprising worm gears rotatable mounted in the projection, each worm gear being in engagement with one of the hook elements for pivoting the hook elements, wherein each worm gear is mounted so as to be adapted to be accessible through the fitting bore or transverse bore against whose wall surface the engagement surface of the corresponding hook element is adapted to come into contact.

2. The coupling according to claim 1, wherein the hook elements are comprised of worm segments rotatably mounted about a center point thereof in the projection, each worm segment having an engagement surface extending essentially perpendicularly of a direction of rotation of the worm segment, wherein the engagement surface is configured to be placed in positively engaging contact with the wall surface of the fitting bore or transverse bore.

3. The coupling according to claim 1, wherein the coupling member has at least two projections with longitudinal axes, wherein the longitudinal axes are in alignment with each other and with longitudinal axes of receiving components when connected.

4. The coupling according to claim 1, wherein the coupling member comprises at least two projections having longitudinal axes, the longitudinal axes extending at an angle relative to each other and each longitudinal axis extending through a center point of an end face of each receiving component when connected.

* * * * *